United States Patent Office 3,305,539
Patented Feb. 21, 1967

3,305,539
1:1 CHROMIUM COMPLEX OF 2-HYDROXYNAPH-THALENEAZO-2-HYDROXY-6-NITRO - 7 - NAPH-THALENE SULFONIC ACID SOLUBILIZED WITH ALIPHATIC CARBOXYLIC ACIDS
James F. Feeman, Wyomissing, Pa., assignor to Crompton & Knowles Corporation, Worcester, Mass., a corporation of Massachusetts
No Drawing. Filed Dec. 4, 1963, Ser. No. 328,051
2 Claims. (Cl. 260—150)

This invention relates to a new group of metallized organic dye complexes that are useful in dyeing synthetic polyamide fibers in heavy shades having exceptionally good fastness to washing when applied in combination with other water soluble acid dyes.

The new complexes are 1:1 metal complex azo dyes formed from trivalent chromium and the mono azo dye (C. I. Mordant Black 1) having the structure:

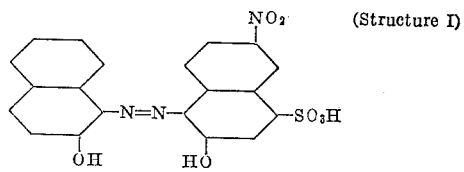

(Structure I)

wherein the complex is chelated or solubilized with certain aliphatic carboxylic acids.

It will be understood that the dyes of this invention not only include the free acids of the azo component but also the water soluble salts thereof.

The complexes of this invention are obtained by conventionally reacting a Structure I azo dye with an equimolar amount of a chromium III (trivalent) salt under acid conditions. The solubility of the resulting 1:1 dye-chromium complex is too low to enable it to be used—either alone or in combination with acid dyes—in conventional dyeing operations carried out in dyeing machines which use a low liquor:goods ratio. It is an object of this invention to render this dye-chromium complex sufficiently water soluble to allow its use in dyeing operations that employ low liquor:goods ratios. This has been accomplished by further complexing or chelating the 1:1 dye-chromium complex with certain aliphatic carboxylic acids such as oxalic, lactic, citric, malic, saccharic, tartronic and especially with tartaric acid. In this connection it should be noted that aromatic organic acids such as salicyclic acid which are sometimes used as chelating agents will render the 1:1 dye-chromium complex soluble, but the resultant complex does not produce compound shade dyeings having the outstanding washfastness achieved by the complexes of the present invention.

In general, the solubilizing or chelating acid should be employed in such concentrations as will produce the desired solubility. In the case of tartaric acid, for example, and where a high degree of water solubility is desired, this may be accomplished by employing about two moles of the acid to one mole of the 1:1 complex.

The solubilized 1:1 dye-chromium complexes of this invention have unique and highly valuable properties in the dyeing of synthetic polyamide fibers—particularly the nylons. The solubilized complex after drying is a black water-soluble powder which dyes polyamide fibers from acid dyebaths. When used alone the solubilized 1:1 complex imparts reddish gray shades to the fibers with an excellent degree of washfastness. The solubilized 1:1 complex will not exhaust well from the dyebath and therefore cannot be used alone for the production of heavy black dyeings. However, when the solubilized 1:1 complex is applied simultaneously with, or following, conventional acid dyes for polyamide, the degree of exhaustion of the complex is markedly increased and the intensity of the dyeing is increased to a degree that is greater than that expected from the increased exhaustion. The dyeings also exhibit exceptional washing fastness even when the acid dyes used do not alone exhibit good fastness to washing. The dyeings obtained from combinations with the solubilized 1:1 complex of this invention have a degree of washfastness approaching that of the complex alone. This new effect is of greatest value in the production of heavy compound shades, such as black, navy, brown, maroon, etc., having washing fastness formerly difficult to obtain using the conventional acid dyes; or even when conventional acid dyes were after-treated with the usual fixing agents for these dyes. With the heavy compound shades maximum results with respect to washing fastness of dyeings are obtained when the solubilized 1:1 dye-chromium complex is present in a molar excess compared to the other dyes in the combination.

Heretofore, Structure I dyes have been complexed with chromium and other metals, and, indeed, have consisted in part of 1:1 dye-chromium complex. Thus, the well-known C.I. Acid Black 52 is a so-called 2:3 complex (i.e., a salt-like compound formed of equal molar amounts of a 1:1 complex cation and a 1:2 complex anion) which is water soluble. When the 2:3 complex is combined with acid dyes, it does not give washing fastness comparable to that obtained with the solubilized 1:1 complexes of the present invention.

When used in making of compound or blended colors, in order to obtain maximum washfastness, it is essential that the 1:1 complex obtained in the initial metallization with chromium be free of both unchromed Structure I dye as well as of the 1:2 complex. The presence of the unchromed Structure I dye will lead to the formation of the 1:2 complex when the solubilizing reaction is carried out. The presence of the 1:2 complex (such as that found in C.I. Acid Black 52) in blended colors will impair the washfastness as compared with the washfastness obtained when the only dye-metal complex present in the blend is the 1:1 complex of this invention. The decrease in the washfastness is proportional to the amount of the 1:2 complex that is present in the dye-chromium-acid complex used as a blending component.

The following examples will serve to illustrate how the compounds of this invention can be prepared and used. In these examples, unless otherwise indicated, parts are by weight; temperatures are given by degrees centigrade and percentages are percentages by weight.

Example 1

Chromium complexed dye, containing one atom of chromium for each molecule of monoazo dye, prepared by heating 43.9 parts of the monoazo dye of the Structure I, with an equimolar amount of a chromium III salt under acidic conditions according to known methods, was pasted thoroughly in 300 parts of water. The resultant slurry of green, slightly soluble material was heated to 70° and treated with 30 parts of tartaric acid. Then the pH of the slurry was raised in five minutes to 7.5 by addition of 40% sodium hydroxide solution, resulting in complete solution as a reddish-black complex. When solution was complete, the pH was adjusted to 4.5 by addition of hydrochloric acid. The product was isolated by addition of sodium chloride (15% by weight based on the volume), and filtration of the precipitate. After drying, the product was a water-soluble black powder which dyed synthetic polyamide fibers from acid dyebaths.

Example 2

In Example 1, while otherwise proceeding as described, the 30 parts of tartaric acid was replaced by 38.4 parts of citric acid. Instead of salting the product from solution, it was isolated by evaporation to dryness. A product similar to that of Example 1 was obtained.

*Example 3*

In Example 1, while otherwise proceeding as described, the 30 parts of tartaric acid was replaced by 25.2 parts of oxalic acid dihydrate. The resultant solution was evaporated to dryness instead of being salted and gave a product very similar to that obtained in Example 1.

*Example 4*

A dyebath was prepared by dissolving 4.0 parts of the dye prepared according to Example 1, 2.0 parts of C. I. Acid Blue 113, and 2.0 parts of the orange dye having the structure:

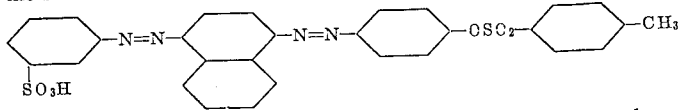

prepared as described in my co-pending application Serial No. 328,123, filed concurrently herewith, in 2000 parts of water. A knitted nylon 66 fabric (100 parts) was entered into the bath, the bath was heated to 100° and the fabric was moved in the bath for 30 minutes. Then 5 parts of acetic acid was added, and the dyeing was continued for one hour additional time. The resultant dyed fabric had an even dense black color. Standard tests showed the dyed fabric to have excellent fastness to both light and severe washing.

*Example 5*

In Example 4, while otherwise proceeding as described, the 2.0 parts of C. I. Acid Blue 113 was replaced by 2.0 parts of C. I. Acid Blue 120. The resultant dyeing was slightly greener in shade than that of Example 4, but had similar excellent fastness properties.

I claim:
1. A 1:1 metal complex azo dye formed from trivalent chromium and a monoazo dye having the structure

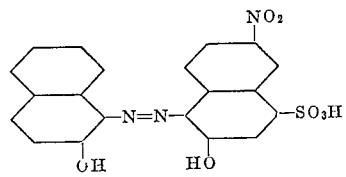

said complex being solubilized with an acid selected from the group consisting of lactic acid, citric acid, oxalic acid, tartaric acid, malic acid, saccharic acid and tartronic acid.

2. A 1:1 dye complex according to claim 1 wherein the complex is solubilized with two moles of tartaric acid for each mole of the 1:1 complex.

References Cited by the Examiner

UNITED STATES PATENTS

| | | | |
|---|---|---|---|
| 1,993,462 | 3/1935 | Straub et al. | 260—150 |
| 2,096,724 | 10/1937 | Andersen | 260—150 X |
| 2,315,870 | 4/1943 | Nadler et al. | 260—150 X |
| 2,384,734 | 9/1945 | Felix et al. | 8—26 |
| 2,544,068 | 3/1951 | Conzetti et al. | 260—150 |
| 2,570,084 | 10/1951 | Widmer et al. | 260—150 |
| 2,871,232 | 1/1959 | Csendes | 260—150 X |
| 2,943,085 | 6/1960 | Oesterlein | 260—150 X |
| 3,041,129 | 6/1962 | Staub | 8—26 |

FOREIGN PATENTS 422,605  1/1935  Great Britain.

CHARLES B. PARKER, *Primary Examiner.*
FLOYD D. HIGEL, *Assistant Examiner.*